US008207886B2

(12) United States Patent
Chambers et al.

(10) Patent No.: US 8,207,886 B2
(45) Date of Patent: Jun. 26, 2012

(54) MODEL-BASED TOMOGRAPHIC RECONSTRUCTION

(75) Inventors: David H Chambers, Livermore, CA (US); Sean K Lehman, Pleasanton, CA (US); Dennis M Goodman, Danville, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 327 days.

(21) Appl. No.: 12/557,546

(22) Filed: Sep. 11, 2009

(65) Prior Publication Data
US 2010/0060509 A1     Mar. 11, 2010

Related U.S. Application Data

(60) Provisional application No. 61/096,266, filed on Sep. 11, 2008.

(51) Int. Cl.
*G01S 13/00*     (2006.01)
(52) U.S. Cl. .......................................... 342/22; 342/118
(58) Field of Classification Search ............... 342/22, 342/118
See application file for complete search history.

(56) References Cited

U.S. PATENT DOCUMENTS

2006/0061504 A1 *   3/2006   Leach et al. ................... 342/22

OTHER PUBLICATIONS

Borek, "An Overview of Through the Wall Surveillance for Homeland Security", Proceedings of the 34th Applied Imagery and Pattern Recognition Workshop, 6 pages, 2005.
Baranoski, "VisiBuilding: Sensing Through Walls", DARPA Special Projects Office, IEEE SAM Workshop, 22 pages, May 31, 2006.

* cited by examiner

*Primary Examiner* — Timothy A Brainard
(74) *Attorney, Agent, or Firm* — John P. Wooldridge

(57) ABSTRACT

A model-based approach to estimating wall positions for a building is developed and tested using simulated data. It borrows two techniques from geophysical inversion problems, layer stripping and stacking, and combines them with a model-based estimation algorithm that minimizes the mean-square error between the predicted signal and the data. The technique is designed to process multiple looks from an ultra wideband radar array. The processed signal is time-gated and each section processed to detect the presence of a wall and estimate its position, thickness, and material parameters. The floor plan of a building is determined by moving the array around the outside of the building. In this paper we describe how the stacking and layer stripping algorithms are combined and show the results from a simple numerical example of three parallel walls.

24 Claims, 11 Drawing Sheets

MODEL-BASED TOMOGRAPHIC RECONSTRUCTION

This application claims priority to U.S. provisional No. 61/096,266, titled "Model-Based Tomographic Reconstruction" filed Sep. 11, 2008.

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

The present invention relates to model-based reconstruction, and more specifically, it relates to using reflected radar waves to generate a parametric representation of the internal layout of a building.

2. Description of Related Art

The term "model-based reconstruction" in the literature most often refers to methods that use numerical wave propagation models to generate simulated data for comparison with measurements. This disclosure uses it in the more restrictive sense of using a parametric representation of the object. The earliest reference to this is the well-known work by Rossi and Willsky [A1-A3], who calculated a maximum likelihood (ML) estimate of location, size, and orientation of single circles and ellipses directly from projections of the object. They showed that the maximum likelihood approach was fairly robust to the presence of obscuring objects and object model errors. In addition, they were able to characterize the errors in the model parameters by calculating the Cramer-Rao lower bounds of the variances. Follow on work by Sauer and Liu [A4], Wang, et al. [A5], and Karl, et al. [A6] generalized this to multiple ellipses and three-dimensional ellipsoids. Milanfor, et al. [A7, A8] applied the maximum likelihood method to parametric models of polygons. The elliptical object model was extended to cylinders by Bresler [A9, A10] and Fessler [A11], who also used both minimum mean-square error (MMSE) and maximum a posteriori (MAP) methods for estimating the object parameters. For the case of a single object in a constant background, one can parameterize only the perimeter using B-splines, Fourier series, or wavelets. Ye, Bresler, and Moulin used this approach to estimate object shape [A16-A18] for both radar imaging and tomography. Mohammed-Djafari and Soussen reconstructed general polyhedral objects by estimating the vertices directly from projections using both ML and MAP approaches [A19-A22]. Finally, Feng, et al. [A23], used a level-set approach to estimating the contours of objects. This early work was primarily theoretical in nature and, except for Ye, et al., was applied exclusively to simple projections through the object. None applied these techniques to measured data.

Model-based reconstruction of actual measured data has been accomplished by a small number of researchers. Ten years ago, Devaney and associates applied maximum likelihood to estimating object location in diffraction tomography [A12-A14]. The approach was applied to ultrasound measurements by Tsihirintzis in 1993 [A15]. Noble, et al. [A28] applied a model-based method for matching stereo x-ray images with CAD models of industrial parts along an assembly line. West and Williams [A29, A30] applied model-based tomography to estimate the circular interface between fluid and air at different levels of a hydrocyclone. They used both electrical resistance tomography and ultrasound to determine the best values for the center and radius. This is also the only example where two different tomographic measurements were combined to determine the best overall parameter values (data fusion).

Perhaps the most relevant work prior to this project was that by Chambers, Goodman, and Leach [A31]. In this effort a model-based reconstruction of a slice through a cylindrical test object was obtained from real radiographic data. The material interfaces in the slice were modeled as ellipses and the parameters (major and minor axes, centers, etc.) were obtained by minimizing the error between simulated projections and the measured projections. A minimization routine found in the MINPACK [A32] package was used. Cramer-Rao lower bounds for the variances of the parameters were also obtained.

Perhaps the most familiar use of tomography is medical x-ray CT imaging. In this application, x-rays are transmitted through a person from a number of different directions. The absorption is measured for each direction, then processed to make an image of the volume x-ray absorptivity. Since different tissue types have different absorptivities, the image reveals the internal structure of bones and organs. This is an example of transmission tomography [A33], which requires propagation through the entire volume of the object. Reconstruction is relatively straightforward since x-rays propagate along straight paths through the object. There is no significant bending, reflection, or multi-path. Since the amount of x-rays absorbed is small compared to the incident field, the reconstruction algorithm is a linear transformation of the data and can be accomplished efficiently using Fast Fourier Transforms. A similar method can be applied to acoustic transmission tomography when the sound speed and absorption variations are small.

Reflection tomography is a technique commonly used by geophysicists for oil exploration [A34]. It combines reflections from multiple views to determine the internal structure of an object or region. Reflection tomography is required in situations where the region of interest is accessible only from one side, no transmission measurements are possible. It is especially sensitive to interfaces, which is ideal for locating underground structures in seismic imaging. However, it can also be applied to ultrasonic inspection of materials and medical imaging [A33]. The algorithm we propose for reconstructing the floor plan of a building is of this type.

Other forms of tomography include optical diffusive tomography (ODT [A35]), optical coherence tomography (OCT [A36]), electrical impedance tomography (EIT [A37]), electrical resistance tomography (ERT [A37]), positron emission tomography (PET [A38]), single photon emission computed tomography (SPECT [A38]), and others. Several of these are based on non-propagating or diffusive fields (EIT, ERT, ODT) and require a different approach than reflection tomography. EIT and ERT are used primarily for geosensing, while ODT is used for biomedical imaging. Both PET and SPECT are particle-based methods similar to x-ray CT and used in biomedical imaging. Optical coherence tomography, like ODT, is used in biomedical imaging but uses the "ballistic" photons that propagate through a highly scattering media without significant scattering. The reconstruction techniques are similar to those used for ultrasonic imaging.

In all applications of tomography, one must choose how to represent the object or region of interest that is to be imaged. The most common choice is to sample the region of interest uniformly in space. The resulting pixels (2D) or voxels (3D) are then assigned a value by the reconstruction algorithm that represents some physical property that interacts with the propagation of the waves sent through it. Typical physical properties include absorption, wave velocity, and density. The advantage of uniform sampling is that it makes no a priori assumptions about the object, and is thus the most general representation. However, it requires large amounts of memory for high resolution images and can become unwieldy in cases where the propagation requires a nonlinear reconstruction algorithm. In cases where there is significant prior information about the object under investigation, it can be advantageous to consider other representations of the object, such as geometric parameterization.

SUMMARY OF THE INVENTION

It is an object of the present invention to provide an image of the floor plan of a building and the objects it contains using a model-based reconstruction algorithm consisting of the object model, forward propagation simulator and a numerical optimization algorithm.

This and other objects will be apparent based on the disclosure herein.

A radar is used to create an image of the floor plan of a multi-story building along with various objects contained within it is obtained using a Bayesian approach to determine parameters that describe the individual elements (floors, walls, windows, etc.) that comprise the building and interior objects. Lower bounds for the variances of the parameters, along with confidence intervals for each element, are also obtained. Prior knowledge of the building structure is incorporated in the Bayesian approach. This prior knowledge can be the number of interior structures, information on the construction materials, data from other sensors, and architectural constraints.

A model-based tomographic reconstruction method can be used to determine the interior structure of a building. In one implementation, a vehicle-mounted radar drives by a building of interest and collects radar returns from a number of look directions, depending on the accessibility of the building. The radar platform is a single antenna or a short array that fits on the vehicle. The data includes a collection of waveforms that together form the response of a type of synthetic array. The radar returns from different look directions overlap in a tomographic reconstruction approach that combines multiple look directions to reconstruct the building structure. Since the data is primarily radar reflections, a reflection tomography approach to reconstruction is used, in contrast to the transmission tomography methods used for x-ray CT imaging. In reflection tomography, time gating is used to "peel" back the structure from the outside inward, making use of prior information about the exterior walls and architectural constraints.

The specific approach for reconstructing the floor plan of a building is based on a geometric parameterization of the various elements that compose a building (walls, doors, ceilings, etc.). In most other forms of tomography, the object, or domain of interest, is represented as a collection of pixels (2D) or voxels (3D), which is a sampling of some physical quantity (absorption, velocity, . . . ) that characterizes the domain. For example, in x-ray CT the physical quantity is the absorptivity of the x-rays, which is represented as a single number for each voxel and often rendered as a gray-scale image. Since the number of voxels for a high resolution 3D reconstruction is often very large ($\sim 10^9$), a practical reconstruction method is based on a linearization of the interaction between the object and the incident wave field. For x-rays, this is a very good assumption since the radiation interacts only weakly with the object, i.e., there are no resonances, internal reflections or deviations from straight line paths. For radar scattering from internal structure in a building, a result is multiple reflections, resonances and other indications of multi-path propagation within a building. In such cases, the data depends nonlinearly on the distribution of the complex dielectric constant (or equivalent electrical parameters) within the volume. The complexity of reconstruction methods that can handle this nonlinearity makes voxel or pixel-based representations of the object impractical. In our approach, the various structural elements of a building are represented by geometric parameters. For example, a wall can be specified by its position, orientation and dimensions; 8 parameters that are independent of its overall size. The equivalent representation in terms of voxels could easily require 100 times more parameters, and increase rapidly with size.

In addition to using a geometric parameterization of the building structure, the present invention breaks up the reconstruction process into a sequence of steps (or queries) based on time gating the data. Beginning with the exterior, a calculation is made of the best values for the parameters that describe structures in successive layers within the building. At each step, only a fraction of the number of parameters for the entire building need be considered. In this way, we reduce the complexity of the reconstruction for each step and use a nonlinear reconstruction algorithm that allows for resonances and multi-path propagation within the building.

As an example, consider the simplified floor plan in FIG. 1A. This consists of an outer and inner rectangular room with a circular object in the center. The walls for each room can be divided into four contiguous panels as shown by the dashed lines. Each panel can be described by a length, thickness, position (x and y coordinates), and material parameter; five parameters all together. The circular object is characterized by its radius, position (x,y), and material; a total of four parameters. The entire structure consists of eight panels and one circular object, for a total of 44 parameters. To create a room, the positions and dimensions of four panels must be constrained so that the panels join without gaps. This adds eight constraints to the set of panel parameters, reducing the number of independent parameters from 20 to 12. If all four panels around a room consist of the same material, the number of independent parameters is further reduced to 9. The addition of continuity constraints and knowledge of the materials is a type of a priori knowledge that will be incorporated into the reconstruction algorithm. The floor plan is determined when the values of all the parameters are known. In FIG. 1A, $P_1$ through $P_6$ are successive positions of a linear array of one transmitter (dot) and six receivers (squares). Now let a linear radar array consisting of one transmitter and six receivers be moved around the building. At each position $P_n$ (n=1, 2, . . . , 6) the radar transmits a pulse and records the time-resolved return on each receiver. The set of returns over all the transmit positions can be assembled in a single matrix called the multistatic response matrix K(t) (6×6). This is the basic data set for tomographic reconstruction.

The reconstruction algorithm is based on the following idea. Let $\hat{K}(t;\theta)$ be an estimate of the data obtained from a numerical simulation given a set of values $\theta$ for the parameters that specify the floor plan. Define the error between the estimated data and actual data as $$E(\theta;t_0,t_f) = \int_{t_0}^{t_f} \|K(t) - \hat{K}(t;\theta)\|^2 dt$$

where $t_0$ and $t_f$ are chosen to reject returns from extraneous objects. To calculate the values for the parameters $\theta$ we minimize the functional $E(\theta;t_0,t_f)+C(\theta)$, where $C(\theta)$ incorporates the constraints and any other prior knowledge (e.g., prior probabilities) about the parameters.

The principle difficulty of the above minimization approach is the large dimensionality of the parameter space.

One way to reduce the dimensionality is to use time gating to reduce the number of parameters required to model the data within each time interval. Suppose we partition the time interval between $t_0$ and $t_f$ into the time intervals containing the returns from the near side of the outer wall ($t_0$ to $t_1$), the returns from the near side of the inner wall ($t_1$ to $t_2$), returns from the object ($t_2$ to $t_3$), and finally the remainder ($t_3$ to $t_f$). For the data within each time interval, we minimize only over the parameters that determine the returns within the time interval, i.e., we subdivide the parameter space into subsets ($\theta_1, \theta_2, \theta_3, \ldots$) and perform a sequence of minimizations:

$$F(\theta_1; t_0, t_1) = \int_{t_0}^{t_1} \|K(t) - \hat{K}(t; \theta_1)\|^2 dt + C(\theta_1),$$

$$F(\theta_2; t_1, t_2) = \int_{t_1}^{t_2} \|K(t) - \hat{K}(t; \theta_2)\|^2 dt + C(\theta_2),$$

Each minimization is over a smaller dimensional parameter space, reducing the mathematical complexity and increasing the efficiency. At the first step we determine the parameters associated with the near side of the outer wall. The second step determines the parameters for the near side of the inner wall, and so on until the entire floor plan is determined.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The ability to remotely deduce the floor plan of a building will be useful for emergency personnel, law enforcement, and military operations. Radar can penetrate building exteriors but the resulting multipath and diffractive effects makes it difficult to recognize and position interior structures (walls, doors, stairs, etc.). The present invention reduces these effects by using an ultrawideband (UWB) radar whose pulse width is smaller than the propagation time for a typical room. The timing of the returned pulses could then be used, in principle, to separate the returns from various interior structures. It is also desirable to incorporate prior information on the construction and layout of the building. This leads naturally to a model-based approach. The building structure is parameterized, a radar propagation code calculates the expected returns, then the parameters are adjusted to minimize the error between the predictions and the data. To implement this fully would require a large number of parameters, a high fidelity three-dimensional propagation code, and an efficient minimization algorithm. Such a scheme is not practical at this time for most buildings of interest. The present invention provides an approach to model based reconstruction for a UWB array that partitions the building into smaller sections, reducing the number of parameters to estimate for each look of the array. It employs an array processing algorithm to create quasi one-dimensional data, which eliminates the need for a full three-dimensional propagation code. The overall effect is to reduce the large, computationally intensive, problem of specifying the parameters of the building into a sequence of smaller, tractable problems, each specifying a small number of parameters.

Figure 1A:
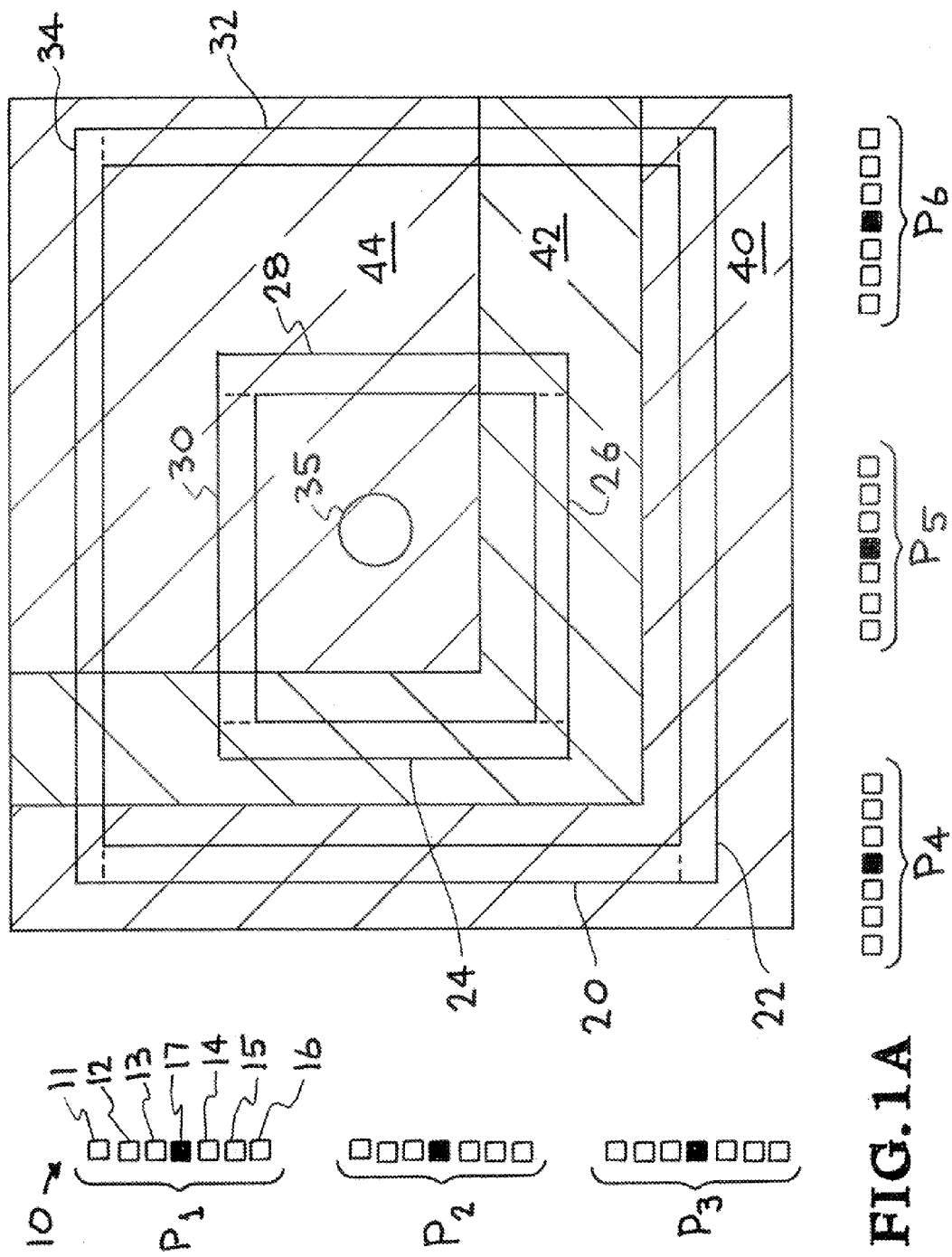
FIG. 1A shows the layer peeling concept applied to wall estimation of an example floor plane.
Figure 1B:
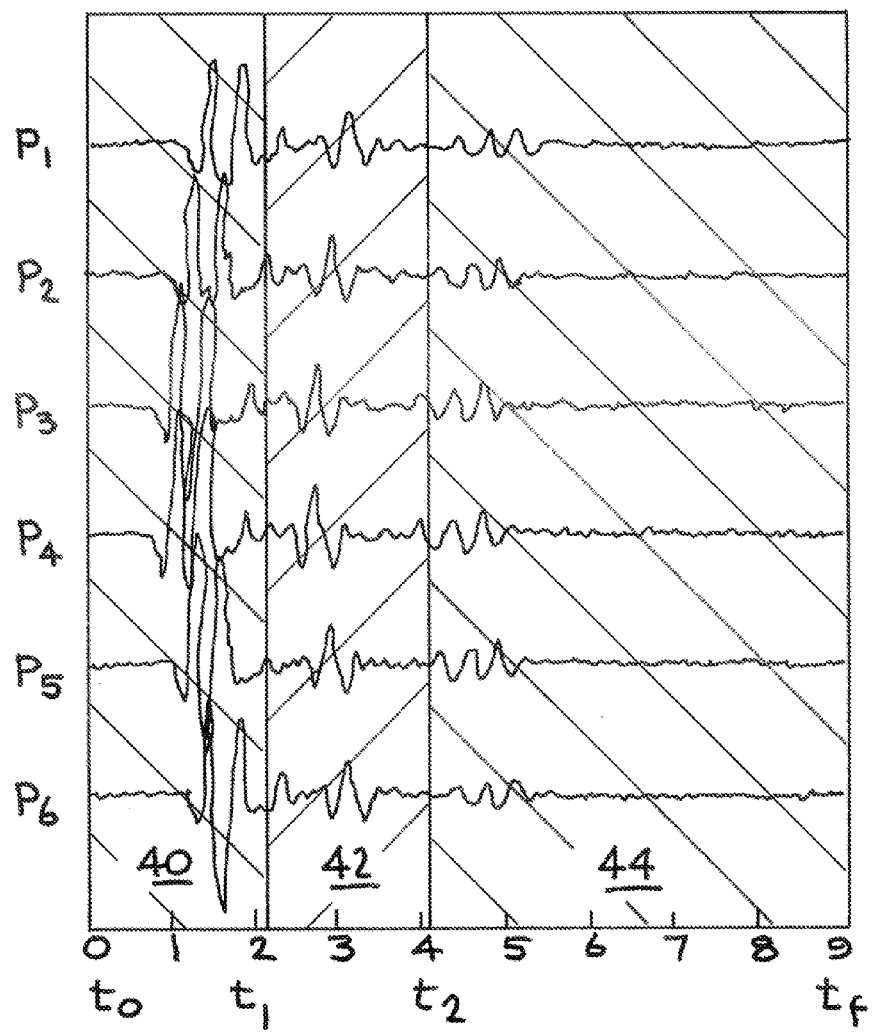
FIG. 1B shows a time series of the measured pulses of the layers of FIG. 1A.

FIG. 1A shows a conceptual system consisting of a linear array 10 of receivers 11-16 with a single UWB transmitter 17. By combining the receiver outputs to produce a signal equivalent to the return from a plane wave propagating perpendicular to the array, the invention detects the presence of interior walls and estimates their position (range to array) by analyzing the signal in successive time gates. By moving the array parallel to the outer walls 20, 22, the interior walls 24, 26, 28, 30 and the far outer walls 32 and 34 can be reconstructed. Note interior structure 35. The successive movement of array 10 is depicted as positions $P_1$-$P_6$. This takes advantage of the usual practice in building construction of aligning most interior walls parallel to the outer walls. To implement this approach, a geophysical array processing technique known as stacking ([B1, B2]) is used to reduce the signals received by each array element to a single quasi-one-dimensional signal. From this, we apply a wall peeling algorithm that estimates the range, thickness, and material parameters for each wall, beginning with the outermost (early time gate) and proceeding to the innermost (latest time gate). FIG. 1A further depicts three time gated regions, 40, 42 and 44. FIG. 1B shows the reflected signals received at each of the positions $P_1$-$P_6$ during each of the time gated regions of FIG. 1A.

The approach used for estimating parameters for walls is based on the layer stripping concept developed in geophysics [B3] and later applied to layered dielectrics by Frolik ([B4], [B5]). However, there are several differences between the layered structures considered earlier and the estimation of walls in buildings that affect the design of the algorithm. Perhaps the greatest difference is that most of the propagation path in a building is through air, effectively free space. The wall material occupies a relatively small portion of the total path. Each wall consists of two closely-spaced interfaces, entrance and exit planes, filled with a material with a relative permittivity ranging from 3 to 10 ([B6], [B7]). Thus the signature of a wall consists of a reflected pulse followed closely by another reflection that is inverted from the first. These two pulses can overlap significantly for typical wall thicknesses creating a "double pulse" signature. The structure of this signature determines the effective wall thickness (optical path depth). Once the optical path depth (OPD) of a wall is determined we can transform time delay to the correct range for structures beyond it. To take advantage of the special signatures for walls, the present invention utilizes the reflected signal instead of estimating a reflection coefficient for each interface. Examples of the latter approach include the work by Nakhkash ([B8], [B9]) and Zhang [B10]. Also, by using the time signals, we can estimate an effective OPD for walls composed of several materials. Building walls often are composed of multiple materials, especially load-bearing and outer walls. Typically these include reinforcing structures such as iron bars or wire mesh. Walls composed of cinder block may contain periodic voids that can cause significant diffraction at certain frequencies. To minimize this we use pulses with spectra below 2 GHz. This allows us to model the wall as a homogeneous, lossy layer characterized by a single attenuation coefficient and optical path depth.

Figure 2:
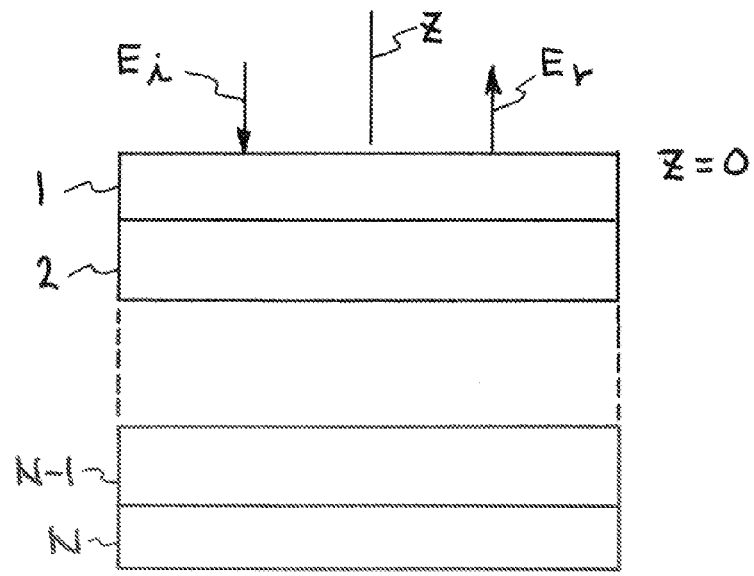
FIG. 2 shows a one-dimensional layer stack.

The one-dimensional reflection model is based on the propagation model found in the text by Chew [B11]. Referring to FIG. 2, consider a stack of N layers perpendicular to the z axis, the z=0 the top of the first layer. Given an electric field pulse $E_0(t)$ launched from a point $Z_s$ above the surface, the reflected field at $Z=Z_s$ can be written as $$E_r(z,t) = \int_{-\infty}^{\infty} \hat{E}_0(\omega) R_{\text{eff}}(\omega) e^{i\omega(t-2z/c_0)} d\omega \quad (1)$$

where $R_{\text{eff}}$ is the effective reflection coefficient for the stack of layers and $\hat{E}_0(\omega)$ is the Fourier transform of the transmitted pulse. The effective reflection coefficient is obtained by solving the backwards iterative equation $$\tilde{R}_{j,j+1} = \frac{R_{j,j+1} + \tilde{R}_{j+1,j+2} X_{j+1}^2}{1 + R_{j,j+1} \tilde{R}_{j+1,j+2} X_{j+1}^2}, \quad (2)$$

$$X_j = e^{-2iL_j/c_j}$$

starting with $\tilde{R}_{N+1,N+2}=0$, and ending at $R_{\text{eff}}=\tilde{R}_{0,1}$. The coefficient $R_{j,j+1}$ are the Fresnel reflection coefficients for each layer interface:

$$R_{j,j+1} = \frac{n_j - n_{j+1}}{n_j + n_{j+1}}, \quad (3)$$

$$n_j = \frac{c_0}{c_j} = \sqrt{\varepsilon_j + \frac{i\sigma_j}{\varepsilon_0 \omega}}$$

Figure 3:
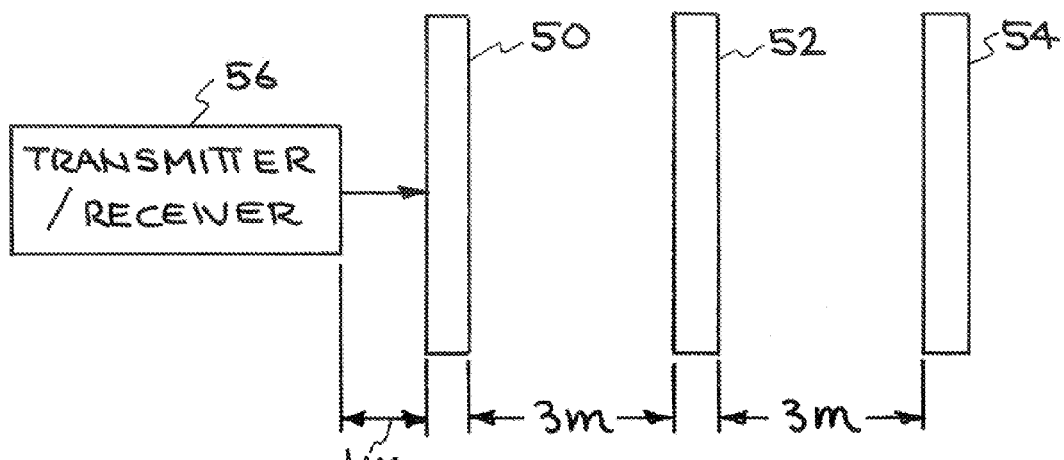
FIG. 3 shows a three wall configuration and transmitted pulse (ns).
Figure 4:
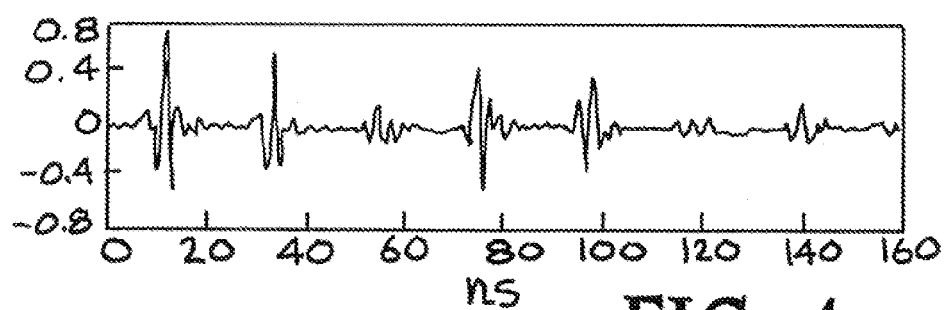
FIG. 4 shows the reflected pulse train from three wall example of FIG. 3.

Each layer is characterized by relative permittivity $\epsilon$, conductivity $\sigma$, and thickness L, with $n_0 = n_{N+1} = 1$. FIG. 3 shows an example of three walls 50, 52 and 54 separated by 3 meters with a pulse emitted from a transmitter/receiver 56 a point one meter from the first wall. The walls are 10 cm thick concrete with $\epsilon = 5.593$ and $\sigma/\epsilon_0 = 0.0246$. The reflected pulse train in FIG. 4 shows both direct returns from each wall and returns from multiple reflections between walls. The wall separations were chosen so that the direct reflection from the third wall would be superposed on the return from multiple reflections between the first two walls, making the inversion for the third wall depend on the fidelity of the inversion of the first two walls.

Figure 5:
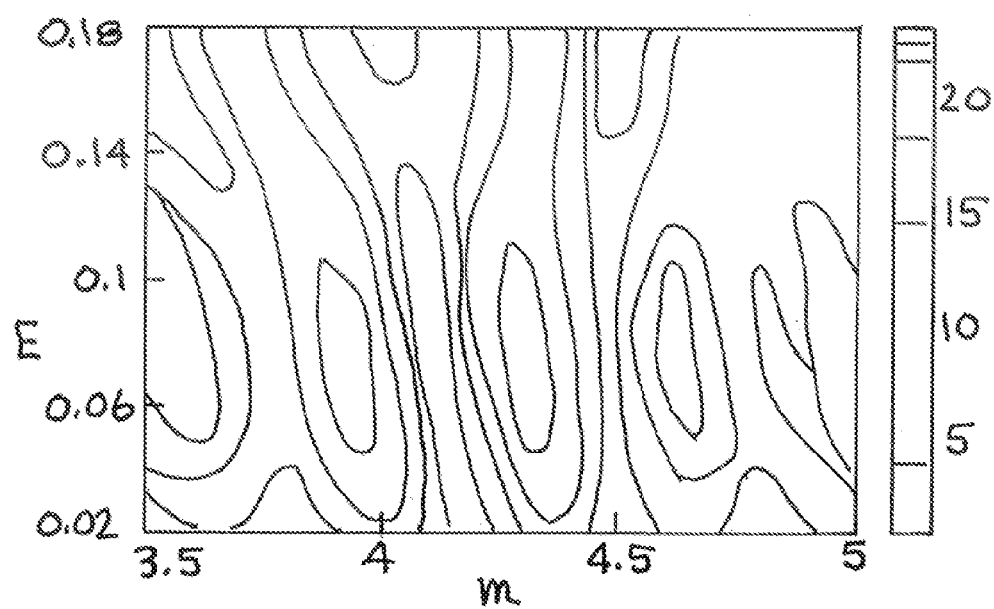
FIG. 5 shows error as a function of range (x axis) and thickness (y axis) for second wall.

The reconstruction algorithm estimates the range, thickness, permittivity, and conductivity of each wall in the model. Starting from an initial guess, it evaluates the forward simulator (Eq. 1) to obtain a predicted reflected return, compares it with the data within a specified time window, then calculates updated parameters. This procedure is repeated until the mean-squared error between predicted data $E_{est}$ and actual data $E_{dat}$ in the specified time window is minimized:

$$Q = \int_{t_s}^{t_f} |E_{dat}(t) - E_{est}(t)|^2 dt, \quad (4)$$

where $t_s$ and $t_f$ are the start and end times for the time window. FIG. 5 shows an image of Q as a function of wall range and thickness for the time window that includes the return from the second wall in FIG. 4. The error has a prominent, well-defined minimum at the location of the true values for range and thickness. However, there are other local minima visible in this slice that would pose problems for any gradient descent minimization algorithm. One way to overcome this problem is to use genetic algorithms or simulated annealing that randomly sample the error in the expected ranges of the parameters. Unfortunately, these algorithms can be computationally inefficient, making them difficult to use by themselves. After investigating simulated annealing and various ways to bootstrap a gradient search using various kinds of data preprocessing, we discovered that a combination genetic/gradient descent algorithm was most reliable. The particular genetic algorithm that we chose is the particle swarm optimization (PSO) method [B12]. A Matlab implementation of this algorithm written by Brian Birge is available in the user-contributed functions area of the Mathworks website [B13]. This implements the common PSO algorithm which begins by choosing a set of random sample points $\{x_i: i=1, 2, \ldots, N\}$ within the parameter space. The error functional is calculated at these points. Displacement vectors $v_i$ are calculated for each sample point (particle) using the following formula for the $k^{th}$ iteration:

$$v_i(k+1) = \phi(k) v_i(k) + \alpha_1 \gamma_{1i}(k)[p_i(k) - x_i(k)] + \alpha_2 \gamma_{2i}(k)[G(k) - x_i(k)], \quad (5)$$

where $\phi(k)$ is a linearly decreasing inertia factor, $\alpha_1$ and $\alpha_2$ are acceleration constants, and $\gamma_{1i}(k)$ and $\gamma_{2i}(k)$ are random number uniformly distributed in the interval between zero and one. The point $p_i(k)$ is the position with minimum error found by particle i on its trajectory through the $k^{th}$ iteration. The point $G(k)$ is the current global minimum over all the particle trajectories up to iteration k. Once the updated displacement vectors are calculated, new sample points are determined by adding them to each sample point, $x_i(k+1) = x_i(k) + v_i(k+1)$. The error functional is evaluated at the new sample points and the process is repeated until all the particles converge on the global minimum. The convergence of the algorithm depends on the choice of acceleration constants, inertia factor, number of particles, and initial size of the parameter space. For our case we chose 24 particles for searching a four-dimensional parameter space for each wall.

After investigating the convergence behavior of the PSO algorithm, we discovered that the estimate of the global minimum found after only 20 iterations was close enough to the true global minimum that a gradient descent algorithm or a simplex could be used without encountering a local minimum. We implemented both methods, using the Matlab function fminunc for the simplex method and lsqcurvefit for the gradient descent Levenberg-Marquardt algorithm. These are found in the Matlab Optimization Toolbox. The gradient descent algorithm has the advantage of allowing the computation of the Cramer-Rao lower bounds of the variances of each parameter from an estimate of the noise variance in the data. The simplex method allows more general definitions of error Q that might be better if the noise is non-Gaussian.

Figure 6:
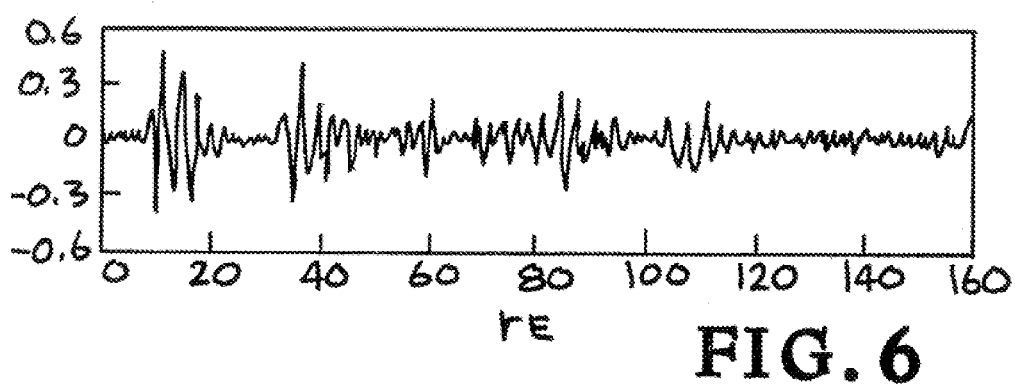
FIG. 6 shows simulated data for three thick walls, SNR=20 dB.

As an example of the reconstruction process, consider the case of the three walls in FIG. 3 except we change the wall thickness from 10 cm to 30 cm. The resulting reflected pulse, with 20 dB of white noise added, is shown in FIG. 6. We start by estimating the parameters of the first wall using only the reflected pulse in the window between 5 and 30 ns. After 20 iterations of the PSO algorithm and 10 iterations of the gradient algorithm, we obtained the values found in the first column of Table I for the first wall. Next we select the time window between 30 and 55 ns, which includes the return from the second wall.

Table I below shows estimated parameters for 3 walls. Exact ranges are 1 m, 4.3 m and 7.6 m. Wall thicknesses are 30 cm. Permittivity is 5.593, and $\sigma/\epsilon_0$=0.0246.

TABLE I

|  | Wall 1 | Wall 2 | Wall 3 |
|---|---|---|---|
| Range | 0.999 ± 0.0003 | 4.2963 ± 0.0003 | 7.5878 ± 0.0003 |
| Thickness | 0.299 ± 0.002 | 0.291 ± 0.002 | 0.294 ± 0.001 |
| Permittivity | 5.65 ± 0.06 | 5.95 ± 0.06 | 5.84 ± 0.05 |
| $\sigma/\epsilon_0$ $\sigma/\epsilon_0$ | 0.031 ± 0.003 | 0.035 ± 0.003 | 0.024 ± 0.023 |

Using our parameter estimates for the first wall, we search for the set of second wall parameters that minimizes the error between model and data (second column of Table I). Again, the algorithm starts with 20 iterations of the PSO algorithm and finishes with 9 iterations of the gradient method. Finally, we select the time window between 55 ns and 100 ns to estimate the third wall parameters, which converges after only 7 iterations of the gradient algorithm. The error bounds for each parameter are lower bounds determined from the data noise variance. We see that the range and thickness estimates agree quite well with the true values 0.3 m for thickness and 1.0 m, 4.3 m, and 7.6 m for ranges to each wall. Estimates of the relative permittivity and conductivity are less precise but still reasonable close to the true values of 5.593 and 0.0246.

To date we have investigated the sensitivity of the reconstruction algorithm to noise level, wall attenuation, and wall thickness. We have also investigated the case where the algorithm tries to estimate the parameters for a wall that is not actually present in the data. From the noise study we determined that we could get reasonable estimates of wall thickness and position for SNR greater than a few dB. This carried over to the study of highly attenuating walls. As long as the SNR for the return of a wall was greater than a few dB, the algorithm gave fairly accurate results for range and thickness. However, the estimates of permittivity and conductivity were more sensitive to SNR. Thus geometrical parameters for walls behind thick attenuating outer walls could be estimated as long as the returns from the interior walls were above the noise level. The material parameter estimates are less of a concern since they do not contribute directly to the extraction of the geometry.

Stacking [B1, B2] is a term borrowed from the geophysical community to describe, fundamentally, delay- and summing of measured scattered field time series to a common plane or line. This is to be distinguished from beam forming [B14] where the data are delay-and-summed or focused to a point. In geophysics the fields are acoustic but, a wave being a wave regardless of the physical phenomenon, the techniques apply to electromagnetic fields.

Consider a transmitter or source of fields located at $R_n^{t_1}$. Consider an array of $N_{rcv}$ receivers located at $\{R_m^r\}_{m=1}^{N_{rcv}}$. The transmitter launches a field into the environment which we assume to consist of multiple parallel, planar multiple layers or multilayers. The field reflects off of, transmits into, and undergoes multiple scattering (reverberation) between, the multilayer structure resulting in a backscattered field at the receivers. Let the received field time series be represented by $\{\psi(R_m^r,R_n^t,t)\}_{m=1}^{N_{rcv}}$. When measured and digitized, this is known as a multistatic data matrix or MSDM.

Figure 7:
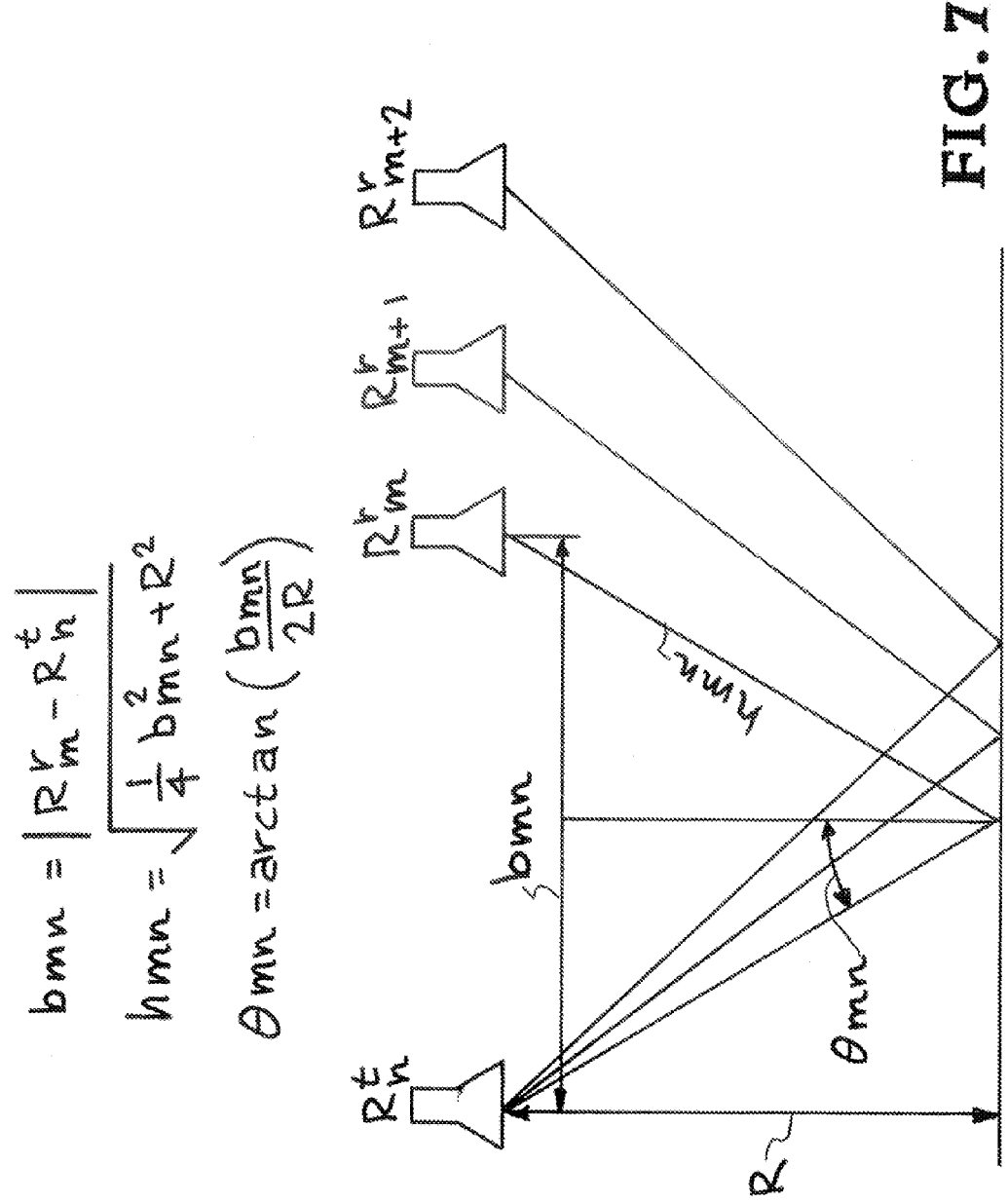
FIG. 7 defines an exemplary baseline between a source and the n-th receiver.

Consider a plane, the stacking plane, located at a range R from the array. We wish to compute the travel time delays, $\{t_{mn}\}_{m=1}^{N_{rcv}}$, from the source to each of the receivers. Using the geometry of FIG. 7, we define the baseline between the source and the n-th receiver by $$b_{mn}=|R_m^r-R_n^t|, \quad (6)$$

where | | represents the vector norm. The propagation distance to the plane is $$h_{mn} = \sqrt{\frac{1}{4}b_{mn}^2 + R}, \quad (7)$$

and $$\theta_{mn} = \arctan\left(\frac{b_{mn}}{2R}\right)$$

resulting in the two-way travel time shift of $$t_{mn} = 2\frac{h_{mn}}{c_0} = 2\frac{\sqrt{\frac{1}{4}b_{mn}^2 + R^2}}{c_0} \quad (8)$$

Where $c_0$ is the background wave speed. The shifted and stacked field time series is then obtained by removing the travel time delay and summing over all received time series:

$$\psi(R_n^t, t) = \sum_{m=1}^{N_{rev}} \psi(R_m^r, R_n^t, t-t_{mn}) \quad (9)$$

The delay-and-sum philosophy is that reflections from the stacking layer will add coherently whereas reflections from other layers and reverberations between layers will sum destructively, thus amplifying the return from the desired layer. Rigorously, the range delay, $h_{mn}$, governed by Eqn. 7 is a hyperbola when viewed as a function of the source/receiver separation, $h_{mn}$. Stacking "flattens" the hyperbolic "smile." From an efficiency point-of-view, stacking reduces a two- or three-dimensional architectural structure to a one dimensional planar multilayer which is rapidly simulated by the one-dimensional scattering model.

Figure 8:
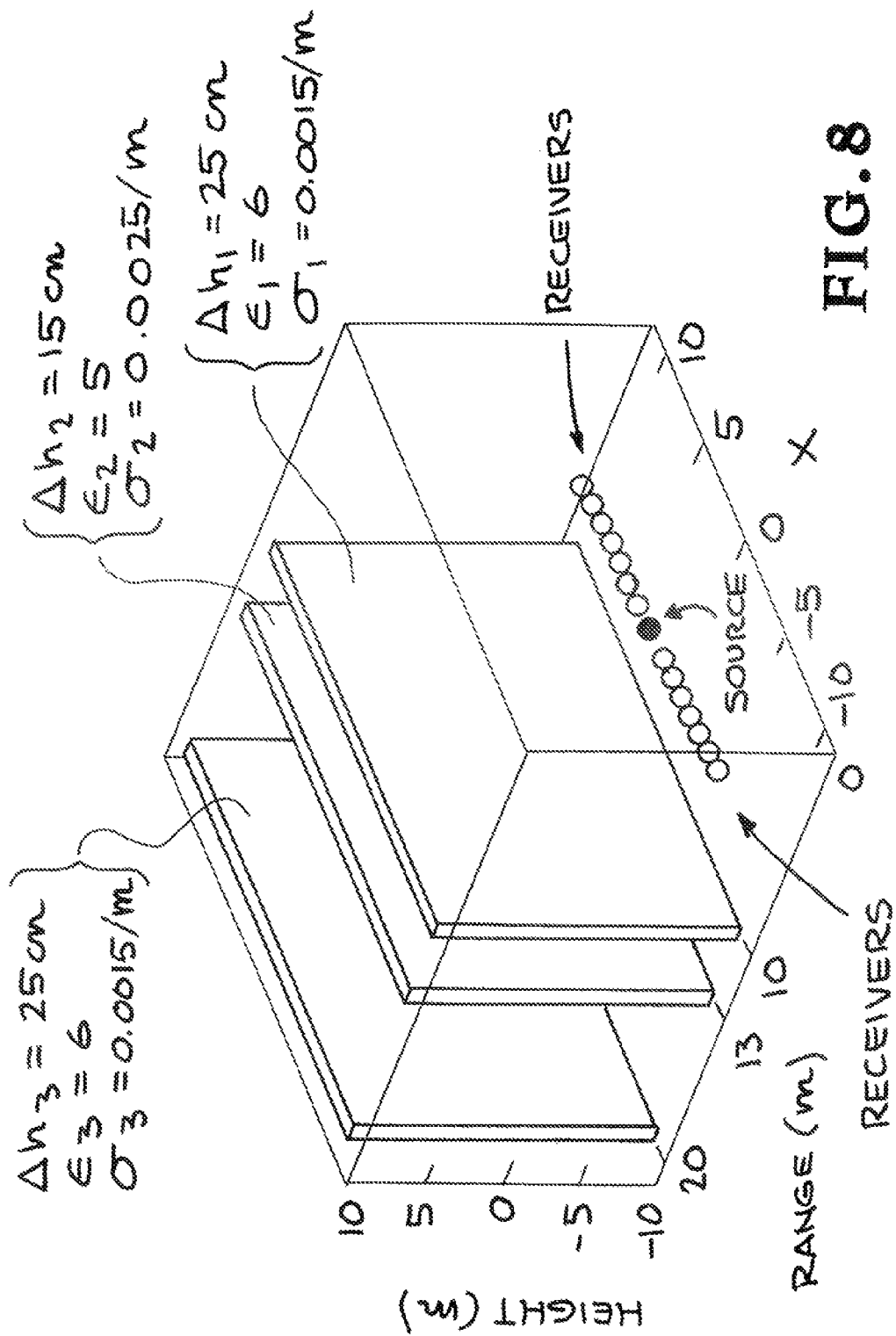
FIG. 8 is an example of three parallel walls.
Figure 9A:
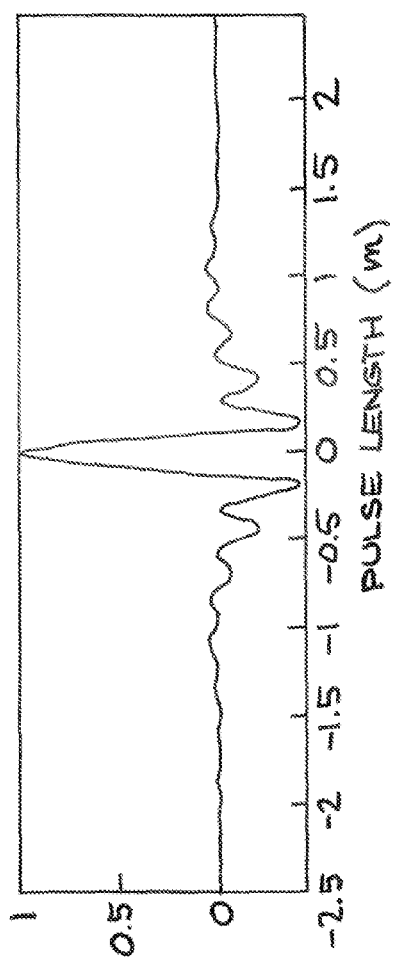
FIG. 9A shows a tapered sinc incident pulse launched by the transmitter and FIG. 9B shows the band width of the pulse of FIG. 9A.
Figure 9B:
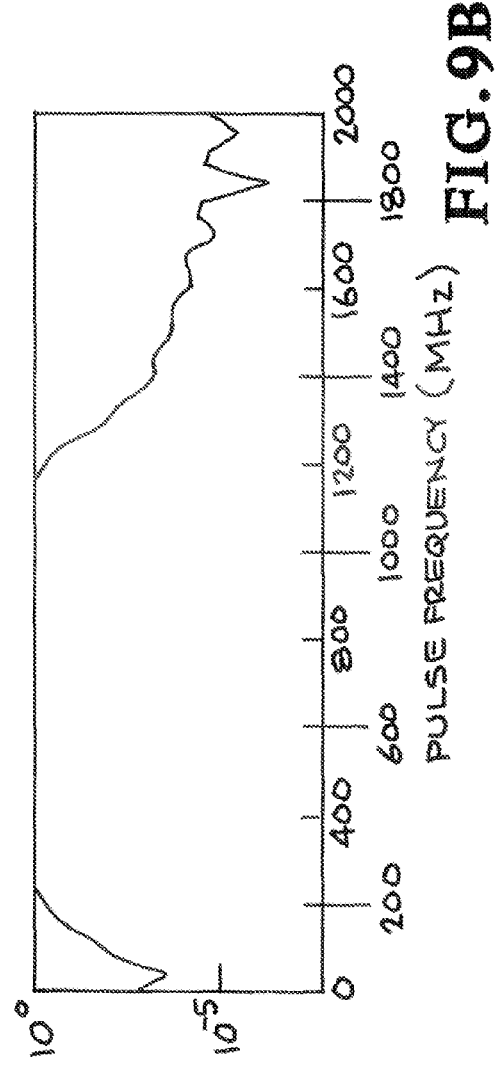
Figures 10A, 10B:
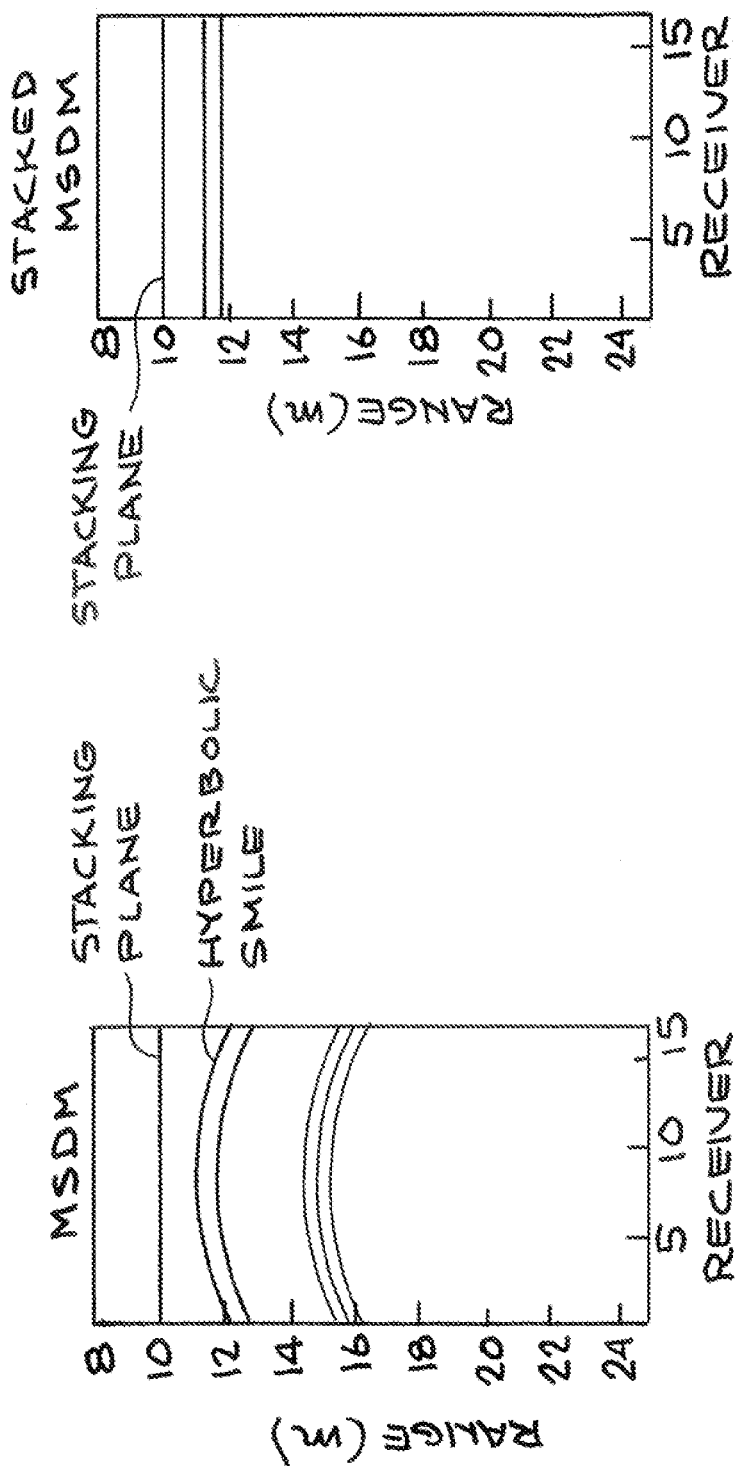
FIG. 10A shows a multistatic data matrix (MSDM) and FIG. 10B shows a stacked version of the MSDM of FIG. 10A.
Figure 10C:
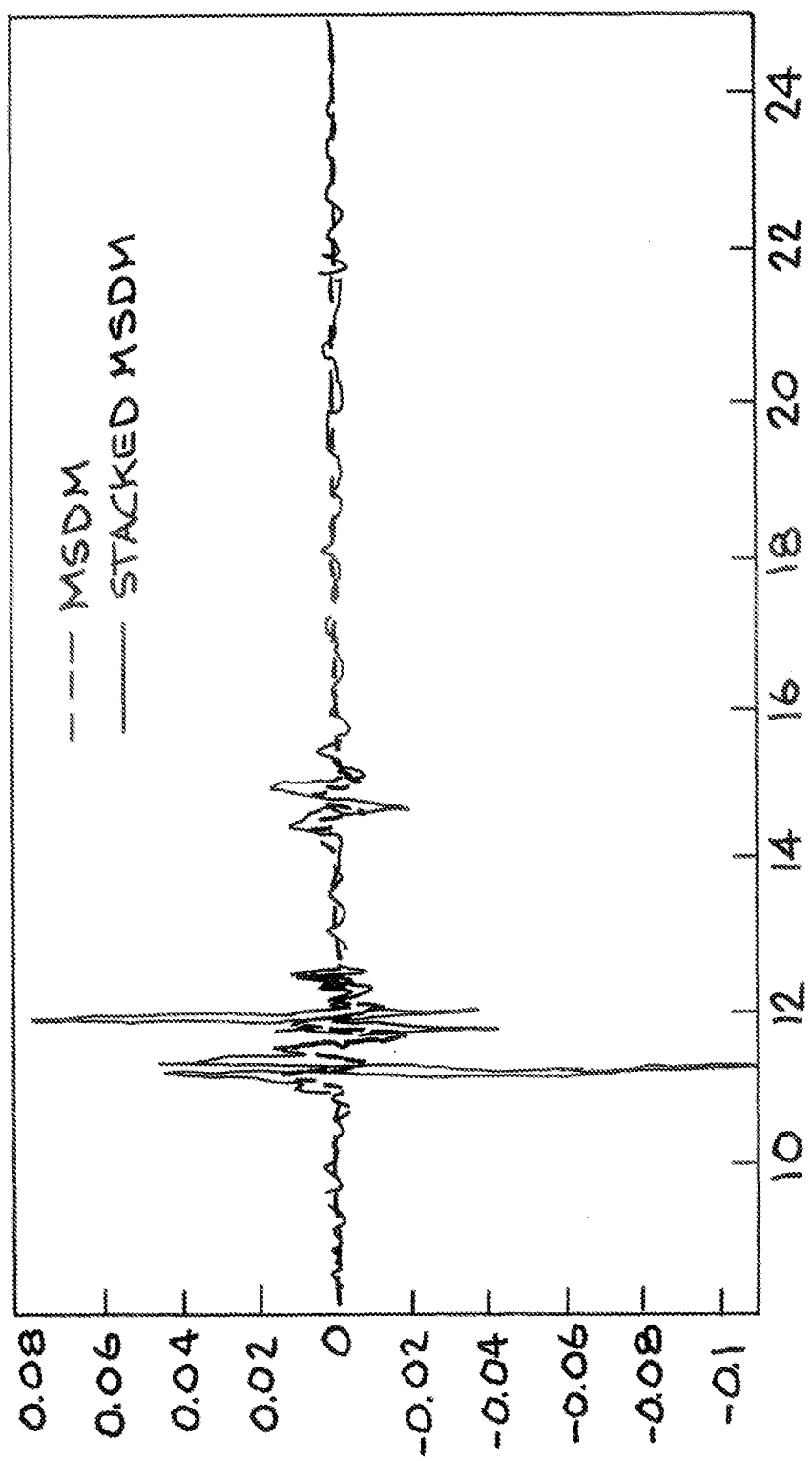
FIG. 10C shows the summed stacked time series.

As an example, consider the three parallel wall example presented in FIG. 8. The wall parameters are listed in Table II. An array consisting of a single transmitter and 1-16 receivers separated by 1 meter is placed at a range of 10 meters in front of the first wall. The transmitter launched a tapered sine incident pulse, as shown in FIG. 9A, with a band width of 200 MHz to 1200 MHz, as shown in FIG. 9B. The data are stacked to the first wall, i.e., the stacking plane range, R, is 10 meters. The multistatic data matrix (MSDM) is shown in FIG. 10A and the stacked MSDM is shown in FIG. 10B. We observe how the hyperbolic "smile" is flattened and that the summed stacked time series have coherently added to enhance the first wall return. FIG. 10C shows the summed fields.

Consider the stacked and summed time series of Eqn. 9 as a measurement off of an unknown structure of walls. For example, we measure Eqn. 9 without knowledge of the walls presented in FIG. 8. Rather, we wish to determine the number and physical parameters of the walls.

One method to do so is through a model-based processor (MBP)[2]. The data of Eqn. 9 are used as the input to the MBP which minimizes the error, as a function of wall parameters, between the measured data and a model of the data:

$$e(\Omega) = \frac{1}{2} \sum_{k=0}^{N_t-1} \left[ \psi(R_n^t, k\Delta t) - \hat{\psi}(R_n^t, k\Delta t; \Omega) \right]^2 \quad (10)$$

where we have now explicitly discretized the time coordinate via, $k\Delta t$, and $\Omega$ represents a vector of wall parameters (range, thickness, permittivity, and conductivity), $$\Omega = \{r_j, \Delta h_j, \epsilon_{rj}, \sigma_j\}_{j=1}^{N_{wall}}, \quad (11)$$

to be determined. The wall model represented by $\hat{\psi}(R_n^t, k\Delta t; \Omega)$ is the one-dimensional parallel plane reflection model of section II.

Figure 11A:
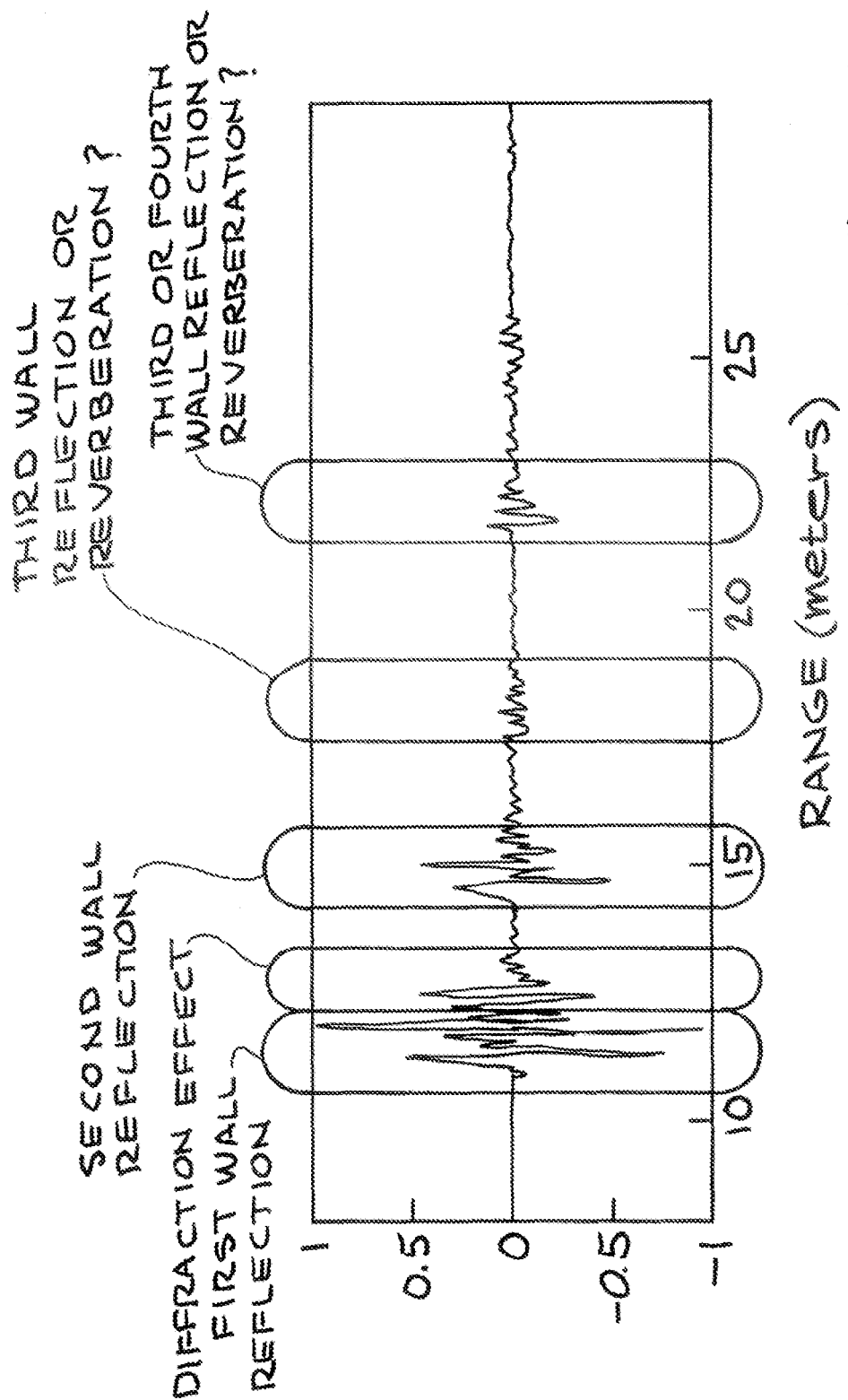
FIGS. 11A-11C show time series components, a final fit and a whiteness test, respectively.

The MBP requires an initial guess of the wall parameters. To obtain the initial guess, consider our observations on the time series components as highlighted in FIG. 11A. The first wall reflection at the 10 meter range is obvious. There is a short backscattered component after the principal reflection which we attribute to edge diffraction (note, diffraction and refraction are not included in the one-dimensional scattering parallel plane model). The second wall reflection is obvious as well around 14 meters. However, there is then a small reflection around 17 meters which may be due either to a third wall or a reverberation between the first two walls. Finally, we observe a reflection around 22 meters which may be a wall or a reverberation. We combined these observations into the initial MBP guess listed in Table III.

Figure 11B:
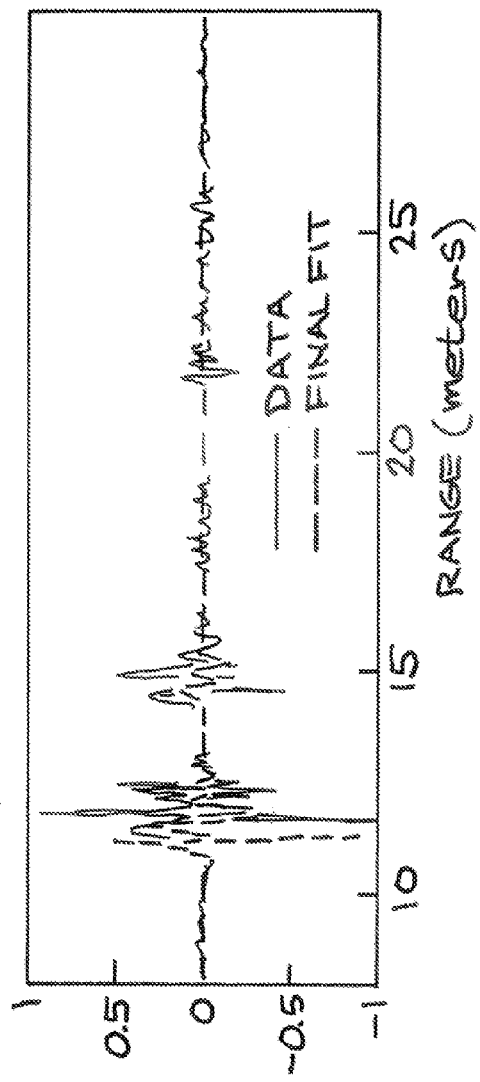
Figure 11C:
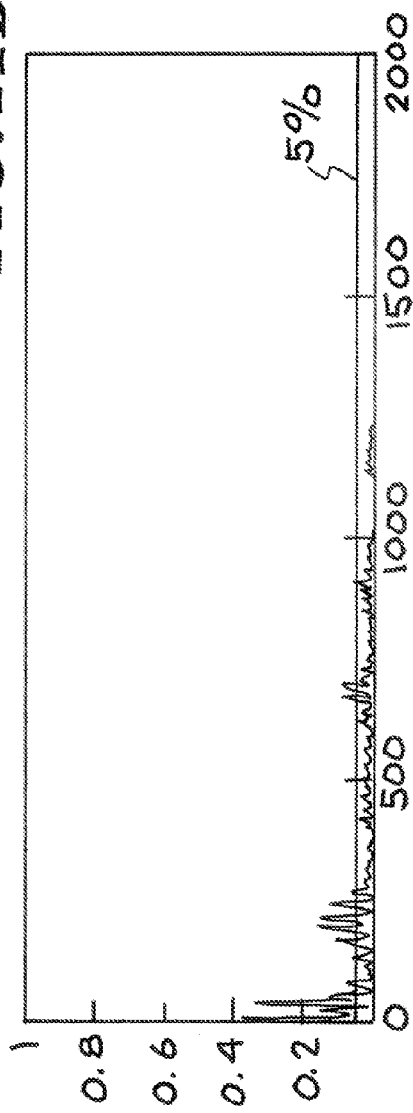

Prior to running the MBP, we added zero-mean white Gaussian noise to the data to achieve a signal-to-noise ratio (SNR) of 50 dB. We ran the MBP and the final fit is presented in FIG. 11B. We observe the diffraction effect is not captured in the final fit. The final parameters returned by the MBP which minimized 2 Eqn. 10 are listed in Table III. A test on the "goodness of the fit" is the whiteness test [B15] shown in FIG. 11C. Ideally, the model of Eqn. 10 captures all the physical effects of the measured data so that the difference between the two results only in the additive (zero-mean white Gaussian) noise. Were this true, the autocorrelation of the difference would be impulsive. The whiteness test determines how far from Gaussian is the difference. The test states a good fit has been achieved when more than 95% of the autocorrelation lies below the 5% threshold. The figure shows 4% is above the threshold, indicating the fit is good.

TABLE II

Parameters used in three wall example.

| Wall # | Range (m) | Thickness (cm) | Relative Permittivity | Conductivity (S/m) |
|---|---|---|---|---|
| 1 | 10 | 25 | 6 | 0.001 |
| 2 | 13 | 15 | 5 | 0.002 |
| 3 | 20 | 25 | 6 | 0.001 |

TABLE III below provides the initial wall guess for the MBP using the observations on the measured data of FIG. 11 and final parameter fits. Observe wall 3 has a relative permittivity close to 1. This indicates it is non-existent and the feature attributed to a wall is actually a reverberation. The true wall parameters are listed in Table II.

TABLE III

| Wall # | Range (m) | Thickness (cm) | Relative Permittivity | Conductivity (S/m) |
|---|---|---|---|---|
| Model-Base Processor (MBP) Initial Guess | | | | |
| 1 | 10 | 25 | 6 | 0.001 |
| 2 | 13 | 20 | 5 | 0.001 |
| 3 | 17 | 20 | 5 | 0.001 |
| 4 | 20 | 25 | 6 | 0.001 |
| Final Wall Estimates | | | | |
| 1 | 10.02 | 24.94 | 5.5 | 0.006 |
| 2 | 13.05 | 14.54 | 4.8 | 0.02 |
| 3 | 17.07 | 25.00 | 1.2 | 0.02 |
| 4 | 20.20 | 24.99 | 5.3 | 0.04 |

Embodiments of the invention provide a model-based wall peeling technique for extracting wall positions in a building. Its performance on a simple collection of three parallel walls has been demonstrated. The technique is designed to analyze multi-look data from a moving ultra wideband radar array. The approach combines two techniques from geophysical inversion, layer stripping and stacking. Stacking is used to combine time series from array elements to create a quasi-one-dimensional signal roughly equivalent to the reflections produce by a plane wave propagating normally to the wall. Time gating is then used to peel off walls starting from the outer wall and proceeding inward. Estimates of optical path depth are combined with the timing of the reflections to determine true wall positions. The model based optimization method combines a gradient search algorithm with a non-gradient based genetic type search algorithm (particle swarm optimization) for extracting the properties of layers in a one-dimensional medium from simulated radar data. The PSO algorithm is used to calculate an initial guess for the gradient method that is close to the global minimum of the mean-square error. The hybrid algorithm shows good performance for a sequence of three walls of various thicknesses.

All references cited herein and U.S. provisional No. 61/096,266, are incorporated by reference.

[A1] D. J. Rossi and A. S. Willsky. Reconstruction from projections based on detection and estimation of objects—parts i and ii: Performance analysis and robustness analysis. IEEE Trans. Acoust. Speech, Signal Processing, ASSP-32: 886-906, 1984.

[A2] D. J. Rossi and A. S. Willsky. Ml estimation of object size and orientation from projection data. In Proc. IEEE ICASSP, volume 9, pages 538-541, 1984.

[A3] D. J. Rossi, A. S. Willsky, and D. M. Spielman. Object shape estimation from tomographic measurements—a performance analysis. Signal Process., 18:63-87, 1989.

[A4] K. D. Sauer and B. Liu. Image reconstruction from a limited number of projections using multiple object detection/estimation. In Proc. ICASSP '90, volume 4, pages 1861-1864, 1990.

[A5] S. Wang, B. Liu, and S. R. Kulkarni. Model-based reconstruction of multiple circular and elliptical objects from a limited number of projections. IEEE Trans. Image Processing, 5:1386-1390, 1996.

[A6] W. C. Karl, G. C. Verghese, and A. S. Willsky. Reconstructing ellipsoids from projections. CVGIP: Graph. Image Process, 56:124-139, 1994.

[A7] P. Milanfar, W. C. Karl, and A. S. Willsky. Reconstructing binary polygonal objects from projections: A statistical view. Comput. Vis. Graph. Image Process, 56:371-391, 1994.

[A8] P. Milanfar, W. C. Carl, A. S. Willsky, and G. C. Verghese. Moment-based geometric image reconstruction. In Proc. ICIP '94, volume 2, pages 825-829, 1994.

[A9] Y. Bresler and A. Macovski. Three-dimensional reconstruction from projections with incomplete and noisy data by object estimation. IEEE Trans. Acoust. Speech, Signal Processing, ASSP-35:1139-1152, 1987.

[A10] Y. Bresler, J. A. Fessler, and A. Macovski. A bayesian approach to reconstruction from incomplete projections of a multiple object 3-d domain. IEEE Trans. Pattern Anal. Machine Intell., 11:840-858, 1989.

[A11] J. A. Fessler and A. Macovski. Object-based 3-d reconstruction of arterial trees from magnetic resonance angiograms. IEEE Trans. Med. Imag., 10:25-39, 1991.

[A12] A. J. Devaney and G. A. Tsihirintzis. Maximum likelihood estimation of object location in diffraction tomography. IEEE Trans. Signal Processing, 39:672-682, 1991.

[A13] G. A. Tsihirintzis and A. J. Devaney. Maximum likelihood estimation of object location in diffraction tomography, part ii; strongly scattering objects. IEEE Trans. Signal Processing, 39:1466-1470, 1991.

[A14] A. Schatzberg, A. J. Devaney, and A. J. Wittens. Estimating target location from scattered field data. Signal Process, 40:227-237, 1994.

[A15] G. A. Tsihirintzis and A. J. Devaney. Application of a maximum likelihood estimator in an experimental study in ultrasonic diffraction tomography. IEEE Trans. Med. Imag., 12:545-554, 1993.

[A16] J C. Ye, Y. Bressler, and P. Moulin. Asymptotic global confidence regions in parametric shape estimation problems. IEEE Trans. Inform. Theory, 46:1881-1895, 2000.

[A17] J C Ye, Y. Bressler, and P. Moulin. Cramer-rao bounds for 2-d target shape estimation in nonlinear inverse scattering problems with application to passive radar. IEEE Trans. Antennas Propag., 49:771-783, 2001.

[A18] J C Ye, Y. Bressler, and P. Moulin. Cramer-rao bounds for parametric shape estimation in inverse problems. IEEE Trans. Image Processing, 12:71-84, 2003.

[A19] A. Mohammad-Djafari and Y. Khayi. Array processing techniques and shape reconstruction in tomography. In Proc. IEEE ICASSP, volume 5, pages 3785-3789, Munich, Germany, 1997.

[A20] A. Mohammad-Djafari. Binary polygonal shape image reconstruction from a small number of projections. ELEKTRIK, 5:127-138, 1997.

[A21] C. Soussen and A. Mohammad-Djafari. Closed surface reconstruction in x-ray tomography. In Proc. IEEE Int. Conf. Image Process, volume 1, pages 718-721, 2001.

[A22] C. Soussen and A. Mohammad-Djafari. Polygonal and polyhedral contour reconstruction in computed tomography. IEEE Trans. Image Processing, 13:1507-1523, 2004.

[A23] H. Feng, W. C. Karl, and D. A. Castanon. A curve evolution approach to object-based tomographic reconstruction. IEEE Trans. Imag. Proc., 12:44-57, 2003.

[A24] K. M. Hanson, G. S. Cunningham, G. R. Jennings, and D. R. Wolf. Tomographic reconstruction based on flexible geometric models. In Proc. IEEE ICIP '94, volume 2, pages 145-147, 1994.

[A25] K. M. Hanson, R. L. Bilisoly, and G. S. Cunningham. Kinky tomographic reconstruction. In Proc. SPIE, volume 2710, pages 156-166, 1996.

[A26] T. E. Milner, D. M. Goodman, B. S. Tanenbaum, and J. S. Nelson. Depth profiling of laser-heated chromophores in biological tissues by pulsed photothermal radiometry. J. Opt. Soc. Am. A-Opt. Im. Sci. Vis., 12 (7): 1479-1488, 1995.

[A27] H. L. Van Trees, Detection, Estimation, and Modulation Theory, Part I, Wiley 1968.

[A28] J. A. Noble, R. Gupta, J. Mundy, A. Schmitz, and R. I. Hartley. High precision x-ray stereo for automated 3-d cad-based inspection. IEEE Trans. Robotics Automation, 14:292-302, 1998.

[A29] R. M. West, X. Jia, and R. A. Williams. Parametric modelling in industrial process tomography. In st World Congress Industrial Process Tomography, pages 444-450, April 1999.

[A30] R. M. West and R. A. Williams. Opportunities for data fusion in multi-modality tomography. In st World Congress Industrial Process Tomography, pages 195-200, April 1999.

[A31] D. H. Chambers, D. M. Goodman, R. R. Leach, "As-built model generation for a cylindrical test object," UCRL-TR-200695 (Sep. 30, 2003).

[A32] MINPACK is a library of nonlinear least-squares and nonlinear equation routines written by Jorge More, Burt Garbow, and Ken Hillstrom, all from Argonne National Laboratory. It is available in NETLIB (http://www.netlib.org/), a repository of freely available software, documents, and databases of interest to the numerical, scientific computing, and other communities. The repository is maintained by AT&T Bell Laboratories, the University of Tennessee, Oak Ridge National Laboratory, and by colleagues world-wide.

[A33] A. C. Kak and M. Slaney, Principles of Computerized Tomographic Imaging, SIAM 2001.

[A34] N. Bleistein, J. K. Cohen, and J. W. Stockwell, Mathematics of Multidimensional Seismic Imaging, Migration, and Inversion, Springer 2000.

[A35] S. R. Arridge and M. Schweiger, Image reconstruction in optical tomgoraphy, Phil. Trans. Royal Soc. London, 352, 717-726

[A36] A. F. Fercher, W. Drexler, C. K. Hitzenberger, and T. Lasser, Optical coherence tomography—principles and applications, Rep. Prog. Phys. 66, 239-303 (2003)

[A37] M. Cheney, D. Issacson, and J. C. Newell, Electrical impedance tomography, SIAM Rev., 41, 85-101 (1999)

[A38] Z-H. Cho, J. P. Jones, and M. Singh, Foundations of Medical Imaging, Wiley 1993

[B1] J. F. Claerbout, Fundamentals of Geophysical Data Processing with Applications to Petroleum Prospecting. McGraw-Hill, 1976, iSBN 0-07-011117-0.

[B2] J. A. Scales, Theory of Seismic Imaging. Samizdat Press, 1994, available via http://samizdat.mines.edu.

[B3] A. M. Bruckstein and T. Kailath, "Inverse scattering for discrete transmission-line models," SIAM Review, vol. 29, pp. 359-389, 1987.

[B4] J. L. Frolik and A. E. Yagle, "Reconstruction of multilayered lossy dielectrics from plane wave impulse responses at two angles of incidence," IEEE Trans. Geosci. Remote Sens., vol. 33, pp. 268-279, 1995.

[B5] J. L. Frolik and A. E. Yagle, "Forward and inverse scattering for discrete layered lossy and absorbing media," IEEE Trans. Circuits Syst. II, vol. 44, pp. 710-722, 1997.

[B6] F. Sagnard and G. E. Zein, "In Situ characterization of building materials for propagation modeling: Frequency and time responses," IEEE Trans. Antennas Propag., vol. 53, pp. 3166-3173, 2005.

[B7] D. Pena, R. Freick, H. D. Hristov, and W. Grote, "Measurement and modeling of propagation losses in brick and concrete walls for the 900-mhz band," IEEE Trans. Antennas Propag., vol. 51, pp. 31-39, 2003.

[B8] M. Nakhkash, Y. Huang, and M. T. C. Fang, "Application of the multilevel single-linkage method to one-dimensional electromagnetic inverse scattering problem," IEEE Trans. Antennas Propag., vol. 47, pp. 1658-1668, 1999.

[B9] M. Nakhkash, Y. Huang, W. Al-Nuaimy, and M. T. C. Fang, "An improved calibration technique for free-space measurement of complex permittivity," IEEE Trans. Geosci. Remote Sens., vol. 281, pp. 453-455, 2001.

[B10] J. Zhang, M. Nakhkash, and Y. Huang, "Electromagnetic imaging of layered building materials," Meas. Sci. Technol., vol. 12, pp. 1147-1152, 2001.

[B11] W. C. Chew, Waves and Fields in Inhomogeneous Media. Piscataway, N.J.: IEEE Press, 1995.

[B12] M. Clerc, Particle Swarm Optimization. Newport Beach, Calif.: ISTE USA, 2006.

[B13] [Online]. Available: http://www.mathworks.com/

[B14] D. H. Johnson and D. E. Dudgeon, Array Signal Processing: Concepts and Techniques. Prentice Hall Signal Processing Series, 1993, iSBN-10 0130485136.

[B15] J. V. Candy, Model-Based Signal Processing. IEEE and John Wiley & Sons, 2006, ISBN-13 978-0-471-23632-0.

[B16] E. K. P. Chong and S. H. Zak, An Introduction to Optimization. John Wiley & Sons, Inc., 1996, iSBN 0-471-08949-4.

[B17] A. R. Gallant, "Nonlinear regression," The American Statistician, vol. 29, no. 2, pp. 73-81, May 1975.

[B18] J. J. E. Dennis and R. B. Schnabel, Numerical Methods for Unconstrained Optimization and Nonlinear Equations, ser. Classics in Applied Mathematics. SIAM, 1996, iSBN 0-89871-364-1.

[B19] P. E. Gill, W. Murray, and M. H. Wright, Practical Optimization. Elsevier Academic Press, 1986, iSBN 0-12-283952-8. 8 S. K. Lehman.

An embodiment of the present invention is a method for determining wall positions for a building, comprising: (i) providing an array comprising an ultrawideband (UWB) transmitter and a plurality of UWB receivers; (ii) transmitting an UWB signal from said UWB transmitter into a building from a first location, to produce a first set of reflected signals; (iii) receiving said first set of reflected signals into said receivers, wherein each receiver of said plurality of receivers produces an output signal; (iv) stacking said output signal from said each receiver at each said first location to produce a stacked signal equivalent to a plane wave propagating perpendicular to said array; (v) reducing said stacked signal to a single quasi-one-dimensional (Q1D) signal; (vi) analyzing said Q1D signal in successive time gates to produce stacking data; (vii) peeling said single quasi-one-dimensional signal to produce layer stripping data; (viii) minimizing the mean-square error between a predicted signal and said stacking data and said layer stripping data to produce a first minimized signal; and (ix) repeating steps i-viii at a plurality of locations. The array may be selected from the group consisting of a planar array, a linear array and a synthetic array and the UWB signal may comprise a pulse width that is smaller than the propagation time of an UWB signal across a room of said building. It may be beneficial for the UWB signal to comprise pulses with spectra below 2 GHz. The step of analyzing may incorporate known information of the construction and layout of said building. The predicted signal may be calculated from a radar propagation code. The step of peeling may use a reconstruction algorithm to estimate the range, thickness, permittivity, and conductivity of said each wall. The reconstruction algorithm may perform a step of evaluating a forward simulator to obtain a predicted reflected return, compare said predicted reflected return with data within a specified time window, and then calculate updated parameters. The step of evaluating may be repeated until the mean-squared error between predicted data $E_{est}$ and actual data $E_{dat}$ in a specified time window is minimized according to the equation $$Q = \int_{t_s}^{t_f} |E_{dat}(t) - E_{est}(t)|^2 dt,$$

where $t_s$ and $t_f$ are the start and end times for said specified time window. The method may further comprise randomly sampling the error in the expected ranges of the parameters in said reconstruction algorithm, wherein the step of randomly sampling may be carried out with a combination genetic/gradient descent algorithm. The genetic algorithm may comprise a particle swarm optimization (PSO) method. The stacking data may be selected from the group consisting of the presence of structures interior to said building and an estimation of the position of said structures. The layer stripping data may be selected from the group consisting of the range, thickness and material parameters for walls of said building, beginning with the outermost wall and proceeding to the innermost wall. Another embodiment of the present invention is an apparatus for determining wall positions for a building, comprising: an array comprising an ultrawideband (UWB) transmitter and a plurality of UWB receivers, wherein said transmitter can transmit an UWB signal from said UWB transmitter into a building from a first location, to produce a first set of reflected signals, wherein said receivers are configured to receive said first set of reflected signals to produce an output signal; means for stacking said output signal from said each receiver at each said first location to produce a stacked signal equivalent to a plane wave propagating perpendicular to said array; means for reducing said stacked signal to a single quasi-one-dimensional (Q1D) signal; means for analyzing said single Q1D signal in successive time gates to produce stacking data; means for peeling said single Q1D signal to produce layer stripping data; and means for minimizing the mean-square error between a predicted signal and said stacking data and said layer stripping data to produce a first minimized signal.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A method for determining wall positions for a building, comprising:
   (i) providing an array comprising an ultrawideband (UWB) transmitter and a plurality of UWB receivers;
   (ii) transmitting an UWB signal from said UWB transmitter into a building from a first array location to produce a first set of reflected signals;
   (iii) receiving said first set of reflected signals into said receivers, wherein each receiver of said plurality of receivers produces an output signal;
   (iv) stacking said output signal to produce a stacked signal;
   (v) reducing said stacked signal to a single quasi-one-dimensional (Q1D) signal equivalent to a plane wave propagating perpendicular to said array;
   (vi) analyzing said single Q1D signal in successive time windows to identify candidate wall locations;
   (vii) peeling a single Q1D signal at a candidate wall location of said candidate wall locations to produce stripped data;

(viii) minimizing the mean-square error between a predicted signal and said stripped data for a first time window of said successive time windows to produce a first minimized layer signal;
(ix) repeating step viii for subsequent time windows to produce a first minimized Q1D signal; and
x repeating steps i-ix at a plurality of additional array locations.

2. The method of claim 1, wherein said array is selected from the group consisting of a planar array, a linear array and a synthetic array.

3. The method of claim 1, wherein said UWB signal comprises a pulse width that is smaller than the propagation time of an UWB signal across a room of said building.

4. The method of claim 1, wherein said UWB signal comprises pulses with spectra below 2 GHz.

5. The method of claim 1, wherein the step of analyzing incorporates known information of the construction and layout of said building.

6. The method of claim 1, wherein said predicted signal is calculated from a radar propagation code.

7. The method of claim 1, wherein the step of peeling uses a reconstruction algorithm to estimate the range, thickness, permittivity, and conductivity of said each wall.

8. The method of claim 7, wherein said reconstruction algorithm performs a step of evaluating a forward simulator to obtain a predicted reflected return, compares said predicted reflected return with data within a specified time window, and then calculates updated parameters.

9. The method of claim 8, wherein the step of evaluating is repeated until the mean-squared error between predicted data $E_{est}$ and actual data $E_{dat}$ in a specified time window is minimized according to the equation $$Q = \int_{t_s}^{t_f} |E_{dat}(t) - E_{est}(t)|^2 dt,$$

where $t_s$ and $t_f$ are the start and end times for said specified time window.

10. The method of claim 7, further comprising randomly sampling the error in the expected ranges of the parameters in said reconstruction algorithm.

11. The method of claim 10, wherein the step of randomly sampling is carried out with a combination genetic/gradient descent algorithm.

12. The method of claim 11, wherein said genetic algorithm comprises a particle swarm optimization (PSO) method.

13. The method of claim 1, wherein said stripped data is selected from the group consisting of the presence of structures interior to said building and an estimation of the position of said structures.

14. The method of claim 1, wherein said stripped data is selected from the group consisting of the range, thickness and material parameters for walls of said building, beginning with the outermost wall and proceeding to the innermost wall.

15. An apparatus for determining wall positions for a building, comprising:

an array comprising an ultrawideband (UWB) transmitter and a plurality of UWB receivers, wherein said transmitter can transmit an UWB signal from said UWB transmitter into a building from a first array location to produce a first set of reflected signals, wherein said receivers are configured to receive said first set of reflected signals to produce an output signal;
means for stacking said output signal to produce a stacked signal;
means for reducing said stacked signal to a single quasi-one-dimensional (Q1D) signal equivalent to a plane wave propagating perpendicular to said array;
means for analyzing said single Q1D signal in successive time windows to identify candidate wall locations;
means for peeling a single Q1D signal at a candidate wall location of said candidate wall locations to produce stripped data; and
means for minimizing the mean-square error between a predicted signal and said stripped data for a first time window of said successive time windows to produce a first minimized layer signal.

16. The apparatus of claim 15, wherein said array is selected from the group consisting of a planar array, a linear array and a synthetic array.

17. The apparatus of claim 15, wherein said UWB signal comprises a pulse width that is smaller than the propagation time of said UWB signal across a room of said building.

18. The apparatus of claim 15, wherein said UWB signal comprises pulses with spectra below 2 GHz.

19. The apparatus of claim 15, wherein said means for analyzing incorporates known information of the construction and layout of said building.

20. The apparatus of claim 15, wherein said means for peeling comprises a reconstruction algorithm to estimate the range, thickness, permittivity, and conductivity of said each wall.

21. The apparatus of claim 20, wherein said reconstruction algorithm performs a step of evaluating a forward simulator to obtain a predicted reflected return, compares said predicted reflected return with data within a specified time window, then calculates updated parameters.

22. The apparatus of claim 20, further comprising means for randomly sampling the error in the expected ranges of the parameters in said reconstruction algorithm.

23. The apparatus of claim 15, wherein said stripped data is selected from the group consisting of the presence of structures interior to said building and an estimation of the position of said structures.

24. The apparatus of claim 15, wherein said stripped data is selected from the group consisting of the range, thickness and material parameters for walls of said building, beginning with the outermost wall and proceeding to the innermost wall.

* * * * *